Figure 1:
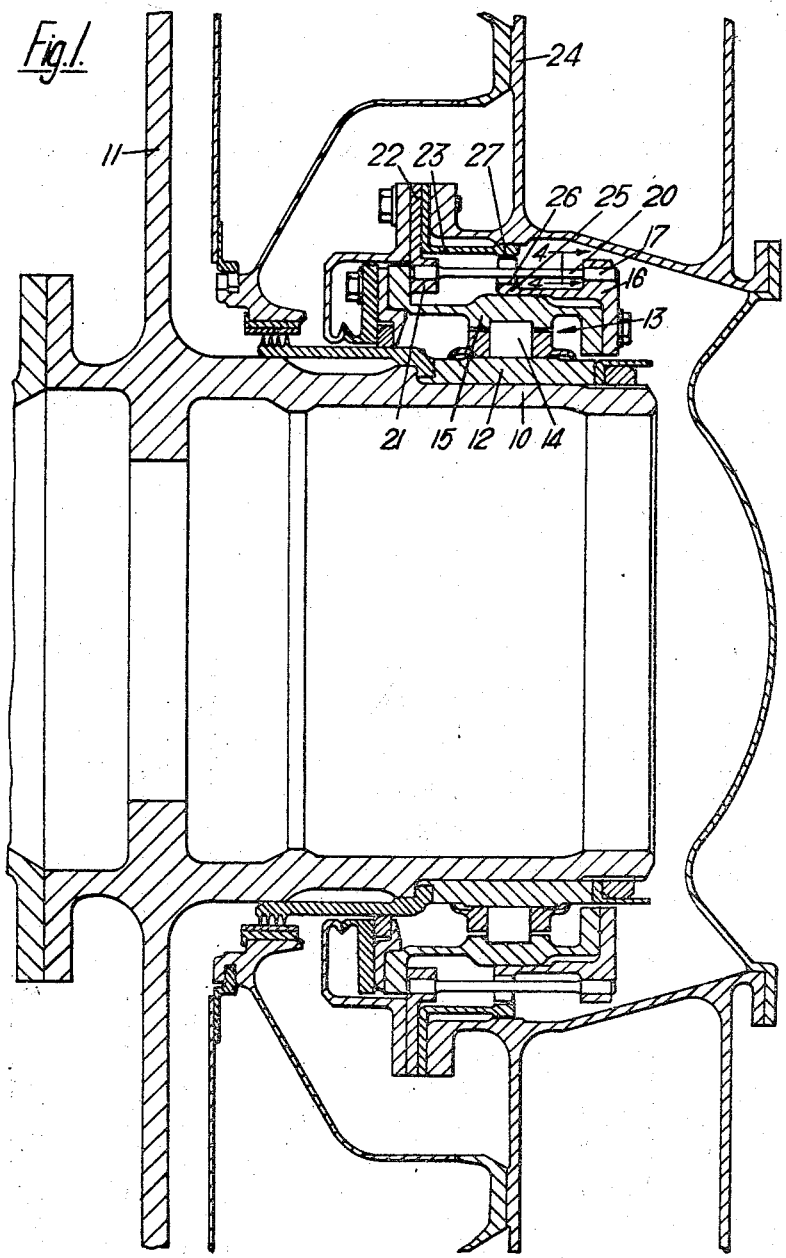

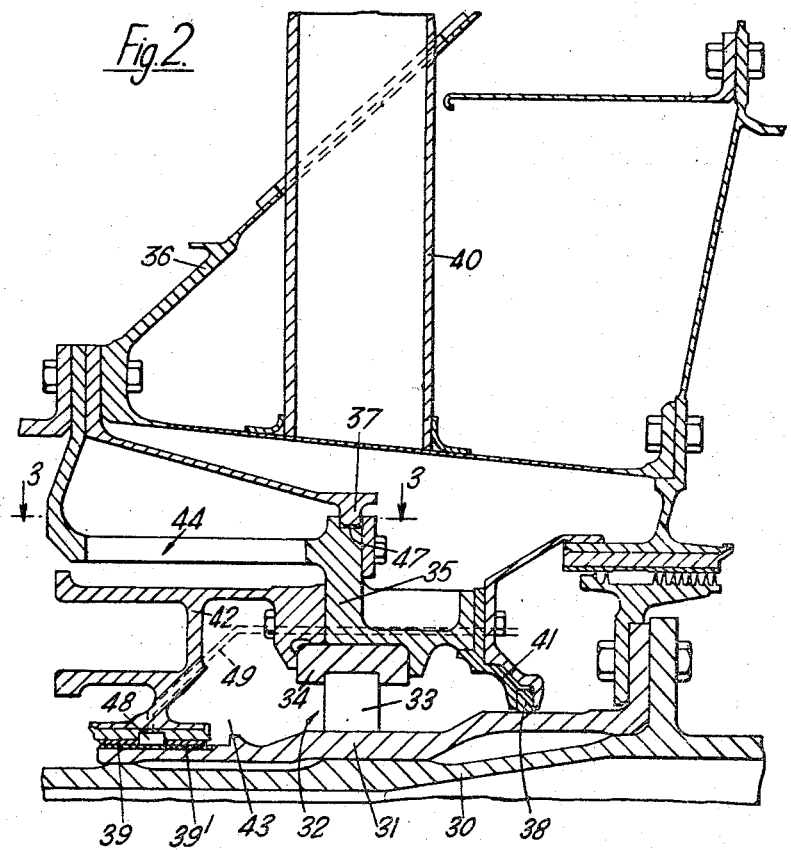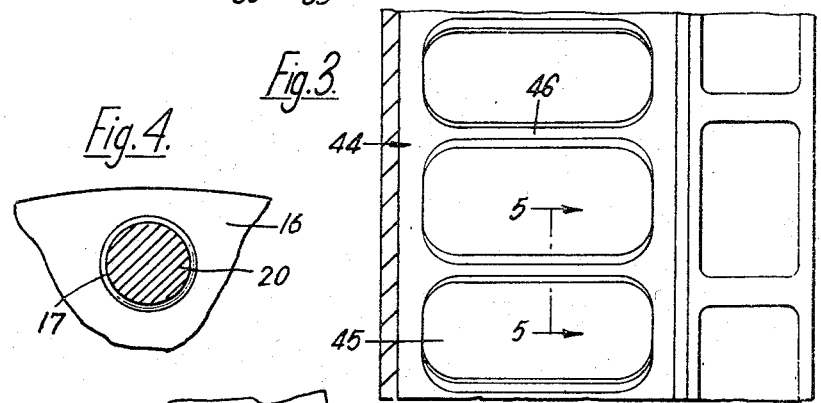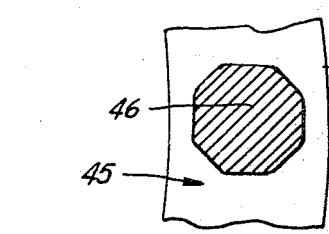

United States Patent Office 3,205,024
Patented Sept. 7, 1965

3,205,024
BEARING
Frederick William Walton Morley, Castle Donington, and Donald McLean and Cyril Armer, Derby, England, assignors to Rolls-Royce Limited, Derby, England, a company of Great Britain
Filed Dec. 26, 1962, Ser. No. 246,982
Claims priority, application Great Britain, Jan. 12, 1962, 1,308/62
1 Claim. (Cl. 308—184)

This invention concerns bearings.

According to the present invention there is provided a bearing at least one portion of which is resiliently connected to fixed structure by a plurality of angularly spaced apart, axially extending, resilient bars each of which is at least substantially circular in cross section. Preferably the bearing comprises rolling elements each of which is in rolling contact with inner and outer races, one of said races being resiliently connected to the said fixed structure by the said bars.

The term "rolling elements" is to be understood to include roller bearings, needle bearings, ball bearings and the like.

Alternatively, however, the bearing could be a plain bearing which could, for example, be oil or air lubricated.

It will be appreciated that the resilient conection of the said one race to fixed structure will insure the damping of vibrations transmitted to the bearing. Since, moreover, the said bars are substantially circular in cross section, the elastic properties of the bars, and the loads carried by individual bars, will not be affected by the direction of the vibration.

In one embodiment of the invention, the bars are not integral with each other and are substantially perfectly circular in cross section. In this case, the opposite ends of the bars may be respectively received in annular members one of which is secured to the said one race and the other of which is secured to the said fixed structure.

In another embodiment of the invention, the bars are integral with each other and are constituted by portions of a substantially cylindrical member disposed between angularly spaced apart apertures therein. In this case the bars may be octagonal in cross section, having their sharp corners rounded off to make them substantially circular in cross section.

Means are preferably provided for limiting resilient radial movement of the said one race. Thus the last mentioned means may comprise a stop ring which is secured to the said fixed structure and which is spaced by a small annular gap from the said one race or from means secured to the said one race.

Preferably the said one race is the outer race.

Preferably there are two wall members which respectively extend to the upstream and downstream sides of the bearing, said wall members being secured to the outer race and being sealed to the inner race (or to means integral with or secured thereto) by seals which permit a small air leakage therethrough, the wall members forming a chamber with the inner race, means being provided for maintaining the chamber at a lower air pressure than that prevailing on the upstream and downstream sides of the chamber, and means being provided for ensuring that the leakage rates through the seals are equal to each other.

The invention also comprises a gas turbine engine having shafting on which is mounted a compressor and a turbine of the engine, said shafting being journalled within a bearing as set forth above. The said compressor and turbine could be either a low pressure compressor and turbine or a high pressure compressor and turbine.

The bars of the said bearing may have a spring rate such that the maximum vibration amplitude of the bearing during normal running occurs at a rotational speed below the idling speed of the engine.

The invention is illustrated, merely by way of example, in the accompanying drawings, in which:

FIGURE 1 is a broken away section through part of one embodiment of a gas turbine engine provided with a bearing according to the present invention, FIGURE 2 is a broken away section through part of another embodiment of a gas turbine engine provided with a bearing according to the present invention, FIGURE 3 is a plan view taken on the line 3—3 of FIGURE 2, FIGURE 4 is a sectional view taken on the line 3—3 of FIGURE 1 and illustrating the cross sectional view of one of the bars of that figure, the view being enlarged, and FIGURE 5 is a cross sectional view taken on the line 5—5 of FIGURE 3 and illustrating the cross sectional view of the modified form of bars of FIGURES 2 and 3, the view being enlarged.

Referring first to FIGURE 1, a gas turbine engine has a shaft 10 on which is mounted a low pressure compressor (not shown) and a low pressure turbine 11.

The shaft 10 carries an inner race 12 of an end thrust bearing 13 which is disposed immediately downstream of the low pressure turbine 11.

The bearing 13 has rollers 14 which are in rolling contact with the inner race 12 and with an outer race 15. The outer race 15 is bolted to an annular member 16 which is provided with a plurality of angularly spaced apart holes 17 in which are received the downstream ends of a plurality of angularly spaced apart axially extending resilient bars 20 each of which has a substantially circular cross section.

The upstream ends of the bars 20 are mounted in angularly spaced apart holes 21 in an annular member 22. The annular member 22, together with a stop ring 23, is bolted to a strut 24 which extends to the engine casing (not shown) and hence to fixed structure.

The annular member 16 has a flange 25 provided with angularly spaced apart recesses 26 through which the respective bars 20 pass freely. The flange 25 is spaced from the downwstream end of the stop ring 23 by a small annular gap 27.

Referring now to FIGURES 2 and 3, a gas turbine engine has a shaft 30 on which is mounted a high pressure compressor (not shown) and a high pressure turbine (not shown).

The shaft 30 carries an inner race 31 of a bearing 32 which is disposed adjacent the said high pressure turbine. The bearing 32 has rollers 33 which are in rolling contact with the inner race 31 and with an outer race 34.

The outer race 34 is bolted to the downstream end of a substantially cylindrical member 35 whose upstream end is bolted to a wall 36 and a stop ring 37. The wall 36, through which passes a passage 40 for cooling air, etxends to the engine casing (not shown) and hence to fixed structure.

The downstream end of the cylindrical member 35 is bolted to wall member 41, 42 which are disposed on opposite sides of the bearing 32. The wall member 41 carries a seal 38 by means of which it is sealed to the inner race 31. The wall member 42 carries two axially spaced seals 39, 39' by means of which it is sealed to the inner race 31. The wall members 41, 42 define a chamber 43 within which the bearing 32 is disposed, the chamber 43 being supplied with lubricant through an aperture (not shown) in the wall member 42.

The cylindrical member 35 has an axially extending portion 44 which is provided with a plurality of angularly spaced apart substantially rectangular apertures 45. The apertures 45 serve to form the portion 44 into a plurality of axially extending resilient bars 46 which are integral with each other and each of which is disposed between an adjacent pair of apertures 45.

The bars 46 are chamfered to give them an octagonal shape, and the sharp corners of the octagonal bars are then rounded with the result that the bars 46 are substantially circular in cross section.

The downstream end of the stop ring 37 is spaced from the member 35 by a small annular gap 47.

The seals 39, 39' are separated from each other by an annular space 48 which communicates with the downstream side of the wall member 41 by way of a conduit 49. The pressure in the annular space 48 is therefore the same as that on the downstream side of the wall member 41.

In order to prevent the leakage of oil from the chamber 43, the air pressures on the upstream side of the wall member 42 and on the downstream side of the wall member 41 are arranged to be greater than that within the chamber 43, the seals 39, 39' and 38 being such as to permit a small continuous leakage of air into the chamber 43.

It is desirable that the leakage rate through the seals 38, 39' should be the same since if one of the seals is worse than the other, there is a danger of the leakage through the bad seal causing the pressure in the chamber 43 to rise to an extent such that air and oil are forced out through the good seal. On the other hand it is difficult to manufacture the seals so that they have the same leakage rates.

Since, however, the pressure in the annular space 48 is the same as that on the downstream side of the wall member 41, the leakage rates through the seals 38, 39' will be the same even if the leakage rates through the seals 38, 39 should differ considerably.

It will be appreciated that if, because of rotor unbalance or other causes, the shafts 10, 30 are subjected to orbiting loads, the resultant vibrations to which the bearings 13, 32 will be subjected will be isolated in the resilient mounting provided by the bars 20, 46. Moreover, by reason of the substantially circular cross section of these bars, all the bars 20, 46 will carry substantially equal loads whatever may be the direction of the vibrations to which they are subjected.

The stop rings 23, 37 serve to limit resilient radial movement of the outer races 15, 34 and reduce the danger that the bars 20, 46 will break in the event of severe unbalance resulting from turbine blade failure. The stop rings 23, 37, moreover, provide a safeguard against the serious engine failure which would occur during normal running if the bars 20, 46 were to fail in fatigue.

The bars 20, 46 may be given a spring rate such that the maximum vibration amplitude of the bearings 13, 32 during normal running occurs at a speed of say, 400 r.p.m. so that the engine is swiftly rotated through this speed when run up to its idling speed of, say, 5000 r.p.m.

We claim:

In a bearing having a fixed structure, inner and outer races, rolling elements each of which is in rolling contact with the inner and outer races, and a plurality of resilient bars which are formed separate from each other and each of which is substantially circular in cross section, and with one of said races being connected to said fixed structure by said bars, the improvement comprising annular members for mounting said bars whereby opposite ends of the bars are received in separate annular members so as to place said plurality of bars in angularly spaced relationship to one another, one of said annular members being secured to said one race and the other of said annular members being secured to said fixed structure, and wherein said annular members include spaced holes solely for receiving and securing the ends of said bars in said members whereby said bars are held in angularly spaced positions about said one race with the bars extending substantially in the direction of a central longitudinal axis of said race.

References Cited by the Examiner

UNITED STATES PATENTS

| | | | |
|---|---|---|---|
| 2,149,728 | 3/39 | Cronan | 308—26 |
| 2,698,772 | 1/55 | Roberts | 308—184 |
| 3,005,668 | 10/61 | Szydlowski | 308—184 |
| 3,011,840 | 12/61 | Littleford | 308—184 |
| 3,053,590 | 9/62 | Dison | 308—184 |

DON A. WAITE, *Primary Examiner.*

FRANK R. SUSKO, ROBERT C. RIORDON,
*Examiners.*